(12) United States Patent
Bon

(10) Patent No.: US 7,547,021 B2
(45) Date of Patent: Jun. 16, 2009

(54) PROPELLED BICYCLE WITH AUTOMATIC TRANSMISSION

(75) Inventor: Dan Bon, Fountain Valley, CA (US)

(73) Assignee: Nirve Sports, Ltd., Huntington Beach, CA (US)

( * ) Notice: Subject to any disclaimer, the term of this patent is extended or adjusted under 35 U.S.C. 154(b) by 288 days.

(21) Appl. No.: 11/525,365

(22) Filed: Sep. 22, 2006

(65) Prior Publication Data
US 2008/0121452 A1   May 29, 2008

(51) Int. Cl.
*F16H 9/24* (2006.01)
(52) U.S. Cl. .................. 280/11.115; 280/220; 280/205; 280/207; 280/49; 280/70; 280/36
(58) Field of Classification Search ............ 280/11.115, 280/220, 205, 207, 49, 70, 36; 474/49, 70; 701/36
See application file for complete search history.

(56) References Cited

U.S. PATENT DOCUMENTS

| | | | | |
|---|---|---|---|---|
| 3,301,344 | A | * | 1/1967 | Baldwin ..................... 180/205 |
| 4,280,581 | A | | 7/1981 | Rudwick |
| 4,952,196 | A | * | 8/1990 | Chilcote et al. ............... 474/70 |
| 5,163,881 | A | | 11/1992 | Chattin |
| 5,445,567 | A | | 8/1995 | Chattin |
| 6,007,441 | A | | 12/1999 | Tysver |
| 6,047,230 | A | | 4/2000 | Spencer et al. |
| 6,158,294 | A | | 12/2000 | Jung |
| 6,244,415 | B1 | | 6/2001 | Fujii |
| 6,296,072 | B1 | | 10/2001 | Turner |
| 6,354,980 | B1 | | 3/2002 | Grant |
| 6,367,833 | B1 | | 4/2002 | Horiuchi |
| 6,412,800 | B1 | * | 7/2002 | Tommei ..................... 280/220 |
| 6,431,573 | B1 | | 8/2002 | Lerman et al. |
| 6,454,288 | B1 | | 9/2002 | Horiuchi |
| 6,467,786 | B2 | | 10/2002 | Horiuchi |
| 6,629,574 | B2 | | 10/2003 | Turner |
| 6,682,087 | B1 | | 1/2004 | Takeda |

(Continued)

FOREIGN PATENT DOCUMENTS

EP            05102986.6           5/2006

OTHER PUBLICATIONS

Bike Europe, "Stepless Shifting", vol. 10, Apr. 2006.

*Primary Examiner*—Christopher Ellis
*Assistant Examiner*—Cynthia Collado
(74) *Attorney, Agent, or Firm*—Stetina Brunda Garred & Brucker

(57) ABSTRACT

An automatic transmission bicycle including a bicycle frame, a chain ring, a pair of pedals, a wheel, and a plurality of gears coupled to the bicycle frame. The plurality of gears has a plurality of gear combinations defined by at least two gears cooperatively engaged. The automatic transmission bicycle includes an electric motor coupled to the bicycle frame. The automatic transmission bicycle includes a voltage generator configured to generate a current that has a corresponding voltage dependent upon rotational speed of the wheel. The automatic transmission bicycle includes a gear shifter in electrical communication with the voltage generator and configured to receive the current generated by the voltage generator. The gear shifter shifts between two respective gear combinations from the plurality of gear combinations in response to receiving the current that has a corresponding voltage within a predetermined voltage range.

8 Claims, 3 Drawing Sheets

U.S. PATENT DOCUMENTS

| | | |
|---|---|---|
| 6,725,143 B2 | 4/2004 | Takeda |
| 6,726,586 B2 | 4/2004 | Fukuda |
| 6,917,283 B2 | 7/2005 | Takeda |
| 6,959,939 B2 | 11/2005 | Fujii et al. |
| 7,011,322 B2 | 3/2006 | Beale |
| 7,207,584 B2 * | 4/2007 | Forderhase ................ 280/205 |
| 2004/0075420 A1 * | 4/2004 | Uno .............................. 322/1 |

* cited by examiner

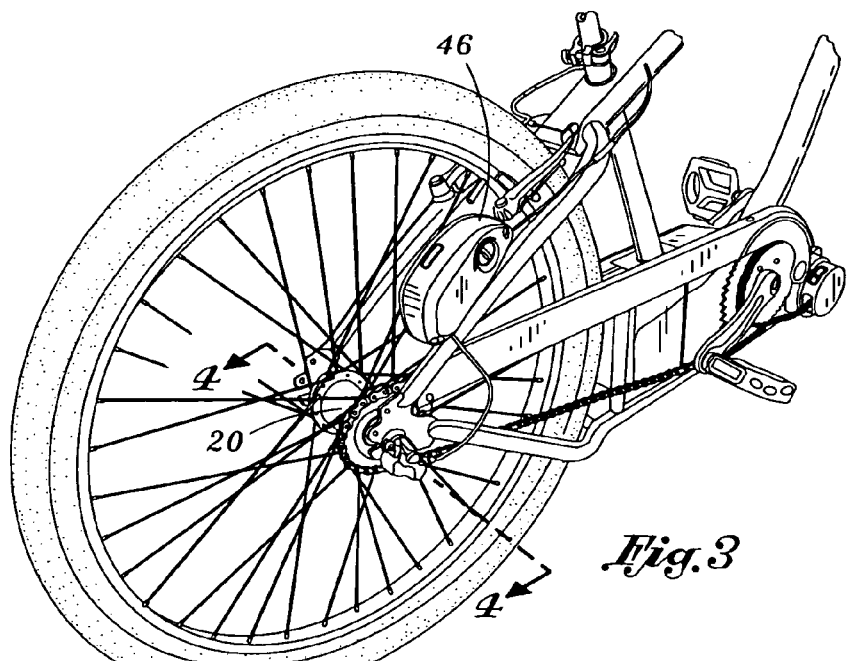
*Fig.3*
*Fig.3A*
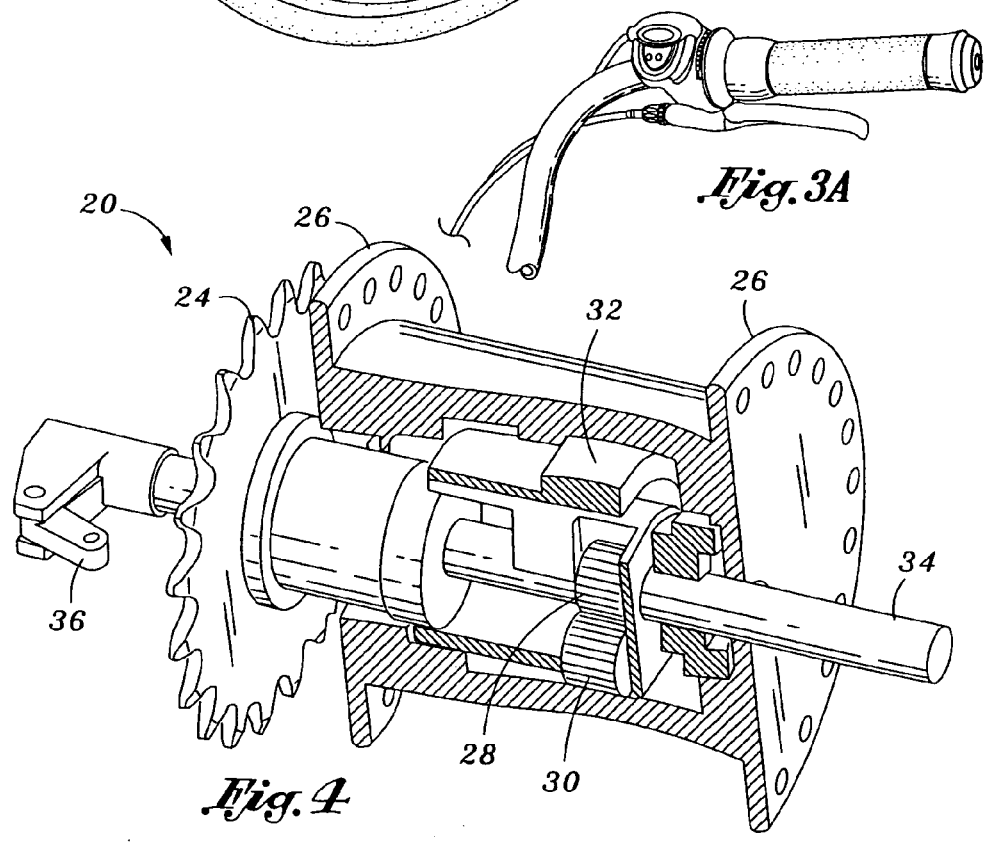
*Fig.4*

PROPELLED BICYCLE WITH AUTOMATIC TRANSMISSION

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates generally to propelled bicycles and, more particularly, to a propelled bicycle with an automatic transmission. Preferably, the automatic transmission of the electric bicycle is dependent upon voltage generated.

Traditional pedal bicycles powered by the user via pedals are well known and are continuously improved upon. One such improvement includes the multi-speed bicycle, which has a plurality of gears. The user of the multi-speed bicycle may shift between different gears based on the users' preferred pedaling speed or based upon the terrain. Multi-speed bicycles have manual transmissions that allow the user to choose when to shift between gears. Generally, the user may shift a lever causing a cable to either pull or release depending on whether the user is up shifting or downshifting between gears. The cable may be used for various gearing systems such as a derailleur gears or an internally geared hub. When the cable is either pulled or released, it may facilitate a rear derailleur to derail the bicycle chain from one gear or sprocket to another gear or sprocket. The disadvantage of manual transmissions is that many bicyclists do not understand the logic of shifting gear levers to reach a desired balance between torque and speed. Unlike driving an automatic transmission automobile, gear shifting on a bicycle is not a simple linear progression, but a function of the ratio of the gear sizes, which may be variable. Many users may fiddle with the gear shifting levers. Shifting gears manually may not be accurate, it is possible to over- or under-shift due to an imprecise rear derailleur. Over- or under-shifting may cause the bicycle chain to slip off the gear or sprocket. To overcome these problems an automatic transmission for the multi-speed bicycle was invented.

The automatic transmission for a multi-speed bicycle is well known in the art. The automatic transmission may consist of a computer-controlled system within a gear shifter that monitors the speed and momentum of the bike usually via a wheel-mounted sensor. The computer system may process information to determine an appropriate speed at which to shift gears. The processor may instruct the gear shifter to pull or release the cable of the gearing system to shift between gears.

A further improvement upon the traditional pedal bicycle was the electric bicycle. The electric bicycle is well known in the art. The electric bicycle generally consists of a battery powered dc electric motor coupled to the bicycle frame. The electric bicycle may be powered by the electric motor. The user may choose not to pedal and rely on the electric motor to power the bicycle. Other advantages may include improved top speed, more power for traversing steep hills, more power for traversing a substantial amount of wind resistance or rough terrain when pedaling the bicycle may prove to be too difficult. Despite the various advantages, there may be a few disadvantages and inefficiencies associated with electric bicycles. Multi-speed electric bicycles with manual transmissions may be harder to determine when to shift gears because it may be harder for the user to judge or determine the appropriate gear when the rider is not pedaling.

The addition of an electric motor and a sufficiently sized storage battery to power the electric motor may add a substantial amount of weight to the bicycle frame. Electric bicycles may include the battery and the electric motor positioned near the upper portion of the bicycle frame. If the electric motor or battery is above the front hub or rear hub of the bicycle frame the center of gravity may be elevated. An elevated center of gravity may make turning the electric bicycle more difficult. The user of the electric bicycle may lose control or balance of the electric bicycle in situations where it is unlikely that a traditional pedal bicycle would encounter the same problem. Additionally, because the battery and electric motor may be bulky it may be uncomfortable for the user to ride the bicycle. The user may have to use caution to avoid contacting the battery or motor with his or her legs while riding.

Starting from rest with an electric bicycle may be very challenging. If a user would like to start from rest on a steep hill or difficult terrain, a substantial amount of torque may be required. Direct current electric motors generally have the highest torque output at high revolution per minute ("rpm") range. Because the electric bicycles may only achieve the requisite torque at a substantial rpm level, the electric bicycle may not have enough power to start from rest.

Thus, there exists a need in the art for an improved electric bicycle.

BRIEF SUMMARY

According to an aspect of the present invention, there is provided a propelled automatic transmission bicycle. The automatic transmission bicycle includes a bicycle frame, a chain ring rotatably coupled to the bicycle frame, a pair of pedals rotatably coupled to the bicycle frame, a wheel rotatably coupled to the bicycle frame, and a plurality of gears coupled to the bicycle frame. The plurality of gears has a plurality of gear combinations defined by at least two gears cooperatively engaged. The automatic transmission bicycle includes a bicycle chain that is extendable about the chain ring. The bicycle chain is in mechanical communication with the plurality of gears. The bicycle chain defines an axis of motion. The automatic transmission bicycle preferably includes an electric motor coupled to the bicycle frame. The electric motor is engageable with the bicycle chain to move the bicycle chain along the axis of motion. The automatic transmission bicycle includes a voltage generator coupled to the bicycle frame. The voltage generator is in mechanical communication with the wheel. The voltage generator is configured to generate a current that has a corresponding voltage dependent upon rotational speed of the wheel. The automatic transmission bicycle also includes a gear shifter coupled to the bicycle frame. The gear shifter is in electrical communication with the voltage generator and configured to receive the current generated by the voltage generator. The gear shifter is configured to exert a mechanical force upon the plurality of gears to shift between two respective gear combinations from the plurality of gear combinations in response to receiving the current that has a corresponding voltage within a predetermined voltage range.

According to further embodiments of the present invention, the gear shifter may comprise a cable in mechanical communication with the plurality of gears. The cable defines a cable axis. The cable may be configured to move axially along the cable axis in response to the gear shifter receiving the current that has a corresponding voltage within a predetermined voltage range. The gear shifter may include a torsion spring in mechanical communication with the cable. The torsion spring may be configured to exert a force upon the cable dependent upon the gear shifter receiving the current that has a corresponding voltage within a predetermined voltage range.

The gear shifter may include a processor unit. The processor unit may have an associated voltage range corresponding to each gear combination from the plurality of gear combinations. The processor unit may facilitate appropriate gear combinations from the plurality of gear combinations in response to receiving the current that has a corresponding voltage within a predetermined voltage range. Additionally, the gear shifter may include the processor unit with an adjustable associated voltage range corresponding to each gear combination from the plurality of gear combinations. If the user desires faster gear combination shifts at lower speeds, the user may decrease the associated voltage range corresponding to each gear combination. If the user would like delayed gear combination shifts at higher speeds, the user may increase the associated voltage range corresponding to each gear combination. The gear shifter may also be configured to receive the current generated by the voltage generator continuously during rotation of the wheel.

The automatic transmission bicycle may include a front hub coupled to the bicycle frame. The voltage generator is coupled to the front hub.

The automatic transmission bicycle may include the electric motor coupled to the bicycle frame between the chain ring and the wheel. The automatic transmission bicycle may also include a battery coupled to the bicycle frame adjacent to the chain ring. The battery is in electrical communication with the electric motor. Additionally, the automatic transmission bicycle may include a planetary gear reducer coupled to the electric motor.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 is a side view illustrating a gear shifter and an internally geared hub;

FIG. 3A is a partial view of a handlebar;

FIG. 4 is a cross-sectional view illustrating an internally geared hub with a planetary gear system;

DETAILED DESCRIPTION

Figure 1:
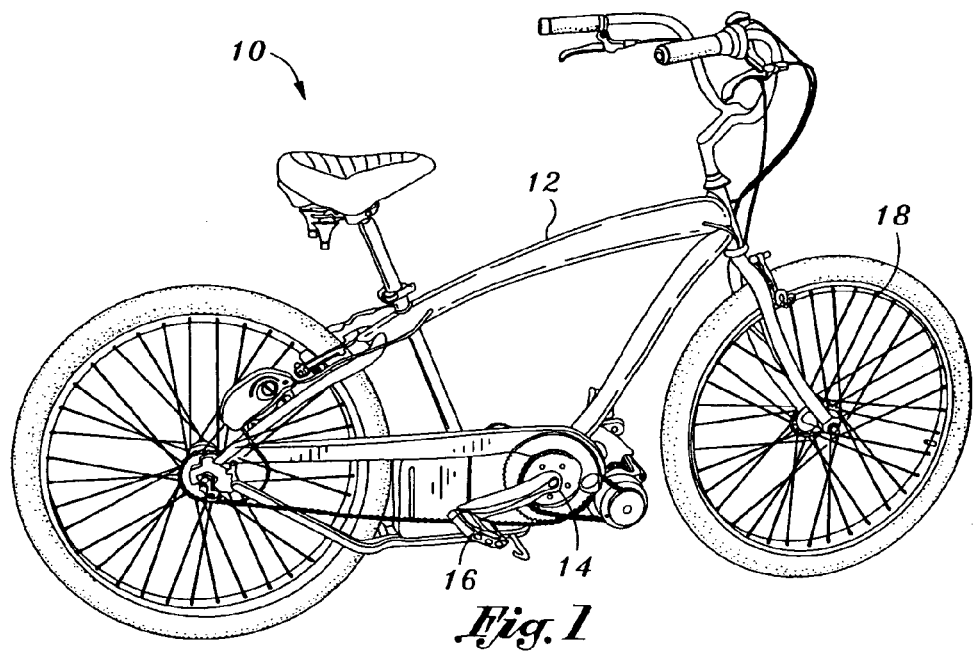
FIG. 1 is a side view of the propelled automatic transmission bicycle with a voltage dependent automatic transmission.

Referring now to the drawings wherein the showings are for purposes of illustrating embodiments of the present invention only and not for purposes of limiting the same, shown in FIG. 1 is a propelled automatic transmission bicycle 10. The automatic transmission bicycle includes a bicycle frame 12, a chain ring 14 rotatably coupled to the bicycle frame 12, a pair of pedals 16 rotatably coupled to the bicycle frame 12, and a wheel 18 rotatably coupled to the bicycle frame 12.

Figure 5:
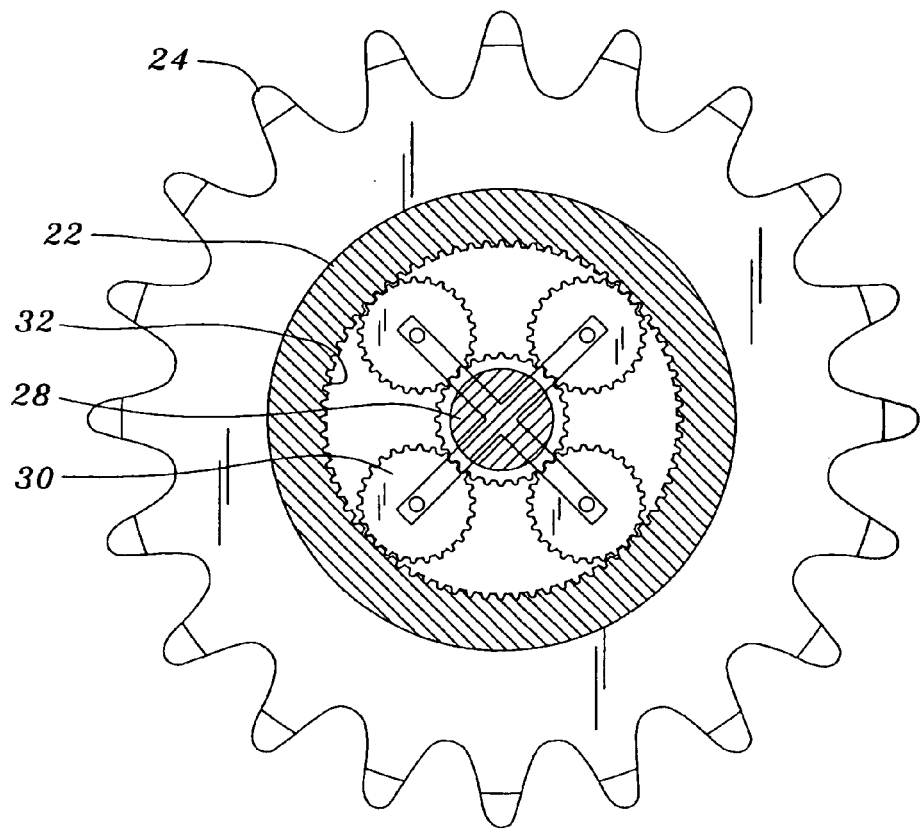
FIG. 5 is a sectional view illustrating a planetary gear system.

Referring now to FIGS. 3, 4, and 5 the propelled automatic transmission bicycle 10 also includes a plurality of gears 20 coupled to the bicycle frame 12. The plurality of gears 20 have a plurality of gear combinations defined by at least two gears cooperatively engaged. In an embodiment of the present invention, the plurality of gears 20 is an internally geared hub as shown in FIG. 4. Internally geared hubs are well known in the art. The advantage of internally geared hubs include gears not exposed to dirt or weather, less maintenance required, more reliable, the gear can be changed when the bicycle is stationary, and less vulnerable than derailleur gears to damage. The internally geared hub 20 may be any conventional type of internally geared hub 20, for example the type commercially available from Shimano Corporation of Osaka, Japan and sold as a Shimano Inter-3 Rear Hub 3-Speed. Internally geared hubs use a planetary gear system 22 to achieve a gear ratio between a sprocket 24 (power input) and a connection to the wheel 26 (power output). FIG. 5 shows a sectional view of a planetary gear system 22 using a sun gear 28 that engages a plurality of planet gears 30 simultaneously. The planet gears 30 engage the inside of a ring gear 32. The planetary gear system 22 produces different gear ratios dependent upon whether the sun gear 28, planet gears 30, or ring gear 32 are used as input, output, or kept stationary. Referring now back to FIG. 4, the internally geared hub 20 has an axle 34 allowing for the planetary gear system 22 to shift back and forth along the axle 34. The axle 34 shifts the planetary gear system 22 in response to a force exerted upon a cable lever 36. When the planetary gear system 22 shifts along the axle 34, the ring gear 32 and the planet gears 30 may be engaged or disengaged from the sprocket 24 and the connection to the wheel 26, thus changing the gear combinations. The change in gear combinations results in a change in gear ratio.

In another embodiment of the invention the plurality of gears 20 may include a cassette with exposed gears such as a derailleur gear system. The plurality of gears 20 may be controlled by a derailleur mechanism utilizing centrifugal weights to provide an automatic transmission function, such as manufactured by Fallon, a Taiwanese company. The derailleur mechanism shifts between gears, effectively changing gear combination and gear ratio. Alternatively, other automatic transmissions are contemplated herein such as an electronic activated rear derailleur system manufactured by Shimano Corporation or a rear hub cone/belt automatic transmission manufactured by Fallbrook Technology of Fallbrook, Calif., the disclosure of which is expressly incorporated herein by reference.

Figure 2:
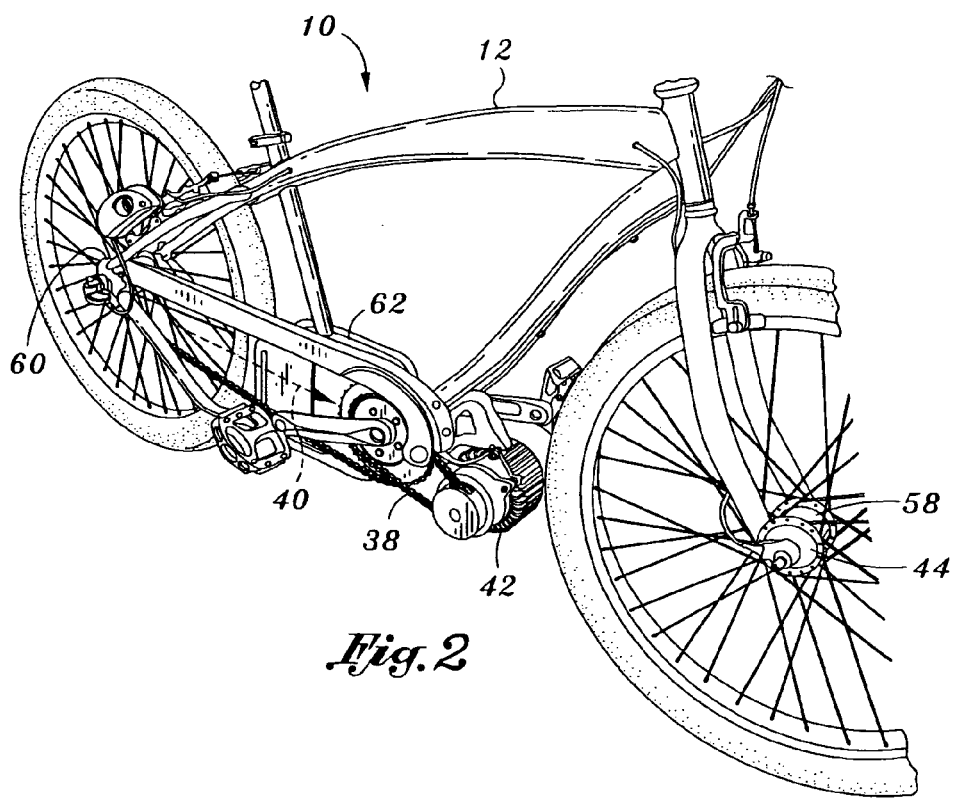
FIG. 2 is another side view of the bicycle with a voltage dependent automatic transmission.

Referring now to FIG. 2, the automatic transmission bicycle 10 includes a bicycle chain 38 that is extendable about the chain ring 14. The bicycle chain 38 is in mechanical communication with the plurality of gears 20. The bicycle chain 38 defines an axis of motion 40. The automatic transmission bicycle 10 includes an electric motor 42. The electric motor 42 is coupled to the bicycle frame 12. The electric motor 42 is engageable with the bicycle chain 38 to move the bicycle chain 38 along the axis of motion 40. The electric motor 42 may be any conventional type of dc electric motor, for example the type commercially available from MAC/BMC of St. Louis, Mo. and sold as a MAC brushless 600-watt direct current electric motor. In addition, those having skill in the art will recognize that other propelling systems such as electric hybrid and gasoline powered engines are contemplated for use herein.

Preferably, the automatic transmission bicycle 10 may include the electric motor 42 coupled to the bicycle frame 12 between the chain ring 14 and the wheel 18. The electric automatic transmission bicycle 10 may also include a battery 62 coupled to the bicycle frame 12 adjacent to the chain ring 14. The battery 62 is in electrical communication with the electric motor 42. In this embodiment of the present invention, the center of gravity for the electric bicycle 10 is minimized by positioning the electric motor 42 between the wheel 18 and the chain ring 14. Furthermore, the location of the battery 62 adjacent to the chain ring 14 helps the electric bicycle 10 maintain a low center of gravity. In addition to minimizing the center of gravity of the bicycle 10, the electric motor 42 and the battery 62 are sufficiently positioned to prevent the user from riding in an awkward position to avoid accidentally contacting the electric motor 42 or the battery 62.

Referring again to FIG. 5, the automatic transmission bicycle 10 may include a planetary gear system 22 coupled to the electric motor 42. The planetary gear system 22 may be used as a planetary gear reducer. Direct current electric motors generally have the highest torque output at high revolution per minute range. The planetary gear reducer allows the direct current electric motor 42 to output the electric motor's highest torque range at low revolution per minute range. Thus, the bicycle 10 has sufficient torque to start from rest without requiring the user to pedal.

Referring again to FIG. 2, the automatic transmission bicycle 10 includes a voltage generator 44. The voltage generator 44 is coupled to the bicycle frame 12. The voltage generator 44 is in mechanical communication with the wheel 18 and is configured to generate a current that has a corresponding voltage dependent upon rotational speed of the wheel 18. Voltage generators are well known in the art. Voltage generators are used on traditional pedal bicycles. For example, a voltage generator may be used to illuminate a lamp mounted on the bicycle frame. Voltage generators are also applied to regular pedal bicycles with an automatic transmission. The voltage generator 44 is generally a self-energizing system that provides the power to the automatic transmission. Voltage generators use electromagnetic principles to convert mechanical rotation into an alternating electric current. The voltage generator 44 moves a magnet near a wire to create a steady flow of electrons. As the rotational speed of the wheel 18 increases, the current generated and the corresponding voltage increase. Similarly, as the rotational speed of the wheel 18 decreases, the current generated and the corresponding voltage decrease. In the preferred embodiment of the present invention, the voltage generator 44 may be the type commercially available from Shimano Corporation of Osaka, Japan and sold as the Shimano Front Hub Dynamo.

The automatic transmission bicycle 10 may include a front hub 58 coupled to the bicycle frame 12. The voltage generator 44 is coupled to the front hub 58. In another embodiment of the invention, the automatic transmission bicycle 10 may include a rear hub 60 coupled to the bicycle frame 12. The voltage generator 44 may be coupled to the rear hub 60.

Figure 6:
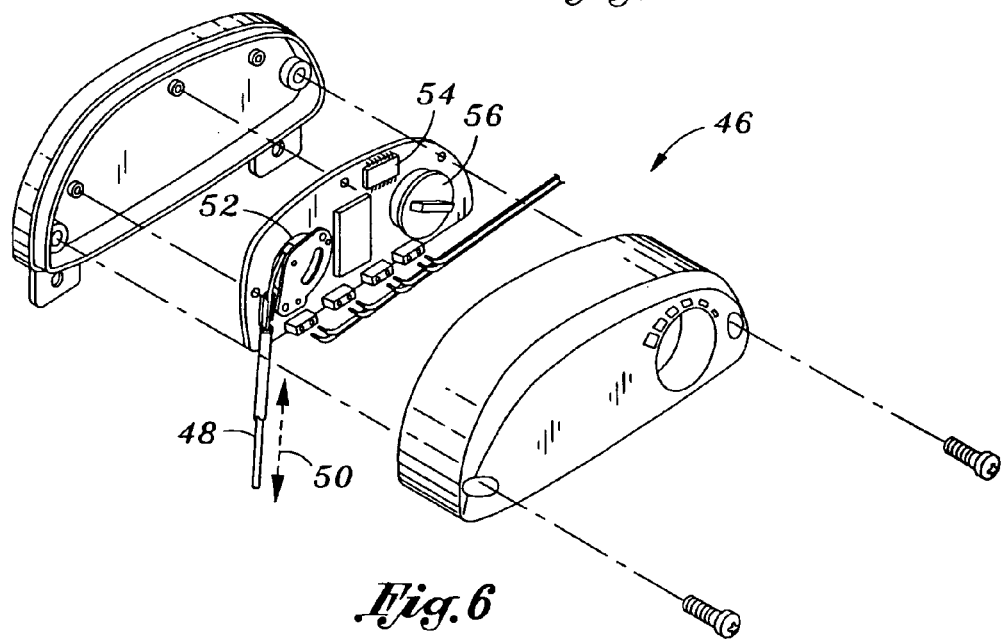
FIG. 6 is a disassembled view illustrating the gear shifter.

Referring now to FIGS. 3 and 6, the automatic transmission bicycle 10 includes a gear shifter 46. The gear shifter 46 is coupled to the bicycle frame 12. The gear shifter 46 is in electrical communication with the voltage generator 44 and is configured to receive the current generated by the voltage generator 44. The gear shifter 46 is configured to exert a mechanical force upon the plurality of gears 20 to shift between two respective gear combinations from the plurality of gear combinations in response to receiving the current having a corresponding voltage within a predetermined voltage range. Gear shifters are well known in the art and have been used for automatic transmissions for non-motorized multi-speed bicycles. In the embodiment of the present invention, the gear shifter 46 is a NEXUS CPU AI-3S30 made by Shimano Corporation located in Osaka, Japan.

According to further embodiments of the present invention, the gear shifter 46 may comprise a cable 48 in mechanical communication with the plurality of gears 20. The cable 48 defines a cable axis 50. The cable 48 may be configured to move axially along the cable axis 50 in response to the gear shifter 46 receiving the current that has a corresponding voltage within a predetermined voltage range. The gear shifter 46 may include a torsion spring 52 in mechanical communication with the cable 48. The torsion spring 52 may be configured to exert a force upon the cable 48 dependent upon the gear shifter 46 receiving the current that has a corresponding voltage within a predetermined voltage range. An aspect of the present invention contemplates receiving a current from the voltage generator 44 having a corresponding voltage within a predetermined voltage range. In response, the torsion spring 52 exerts a force upon the cable 48 resulting in the cable lever 36 shifting and changing the gear combination.

The gear shifter 46 may include a processor unit 54. The processor unit 54 may have an associated voltage range corresponding to each gear combination from the plurality of gear combinations. The processor unit 54 may facilitate appropriate gear combinations from the plurality of gear combinations in response to the gear shifter 46 receiving the current that has a corresponding voltage within a predetermined voltage range. Additionally, the gear shifter 46 may include the processor unit 54 with an adjustable associated voltage range corresponding to each gear combination from the plurality of gear combinations. The associated voltage range may be adjusted using a knob 56. The knob 56 may facilitate alternate shifting points for the different gear combinations. If the user desires faster gear combination shifts at lower speeds, the user may decrease the associated voltage range corresponding to each gear combination. If the user would like delayed gear combination shifts at higher speeds, the user may increase the associated voltage range corresponding to each gear combination. For example, if the user shifts the knob 56 for faster gear combination shifts at lower speeds, the associated voltage range corresponding to each gear combination is decreased. Because the voltage generated is dependent upon the rotational speed of the wheel 18, the associated voltage range may be achieved at a slower rotational speed of the wheel 18. If the user shifts the knob 56 for slower gear combination shifts at higher speeds, the associated voltage range corresponding to each gear combination is increased. Thus, the rotational speed of the wheel 18 must be greater in order to generate a current having a corresponding voltage that is within the associated voltage range. The gear shifter 46 may also be configured to receive the current generated by the voltage generator 44 continuously during rotation of the wheel 18.

While an illustrative and presently preferred embodiment of the invention has been described in detail herein, it is to be understood that the inventive concepts may be otherwise variously embodied and employed.

What is claimed is:

1. An automatic transmission bicycle comprising:
   a bicycle frame;
   a front fork rotatably coupled to the bicycle frame;
   a chain ring rotatably coupled to the bicycle frame, the chain ring comprising an output gear and an input gear;
   a pair of pedals attached to the chain ring;
   a rear wheel rotatably coupled to the bicycle frame;
   a front wheel rotatably coupled to the front fork;

a plurality of gears coupled to the bicycle frame, the plurality of gears having a plurality of gear combinations defined by at least two cooperatively engaged gears;

a first chain extendable about the chain ring and operative to drive the rear wheel;

a motor coupled to the bicycle frame, the motor having an output gear;

a second chain extendable about the output gear of the motor and the input gear of the chain ring for rotateably driving the chain ring under power of the motor;

a voltage generator coupled to the front fork or the bicycle frame, the voltage generator in mechanical communication with the front or rear wheel and configured to generate a current having a corresponding voltage dependent upon a rotational speed of the front or rear wheel; and a gear shifter coupled to the bicycle frame, the gear shifter in electrical communication with the voltage generator and configured to receive the current generated by the voltage generator, the gear shifter configured to exert a mechanical force upon the plurality of gears to shift between two respective gear combinations of the plurality of gear combinations in response to receiving the current from the voltage generator, the gear shifter including:

a cable in mechanical communication with the plurality of gears, the cable defining a cable axis and configured to move axially along the cable axis in response to the gear shifter receiving the current from the voltage generator within a predetermined voltage range; and a torsion spring in mechanical communication with the cable, the torsion spring configured to exert a force upon the cable dependent upon the gear shifter receiving the current within a predetermined Voltage range.

2. The automatic transmission bicycle according to claim 1 wherein the gear shifter further comprises a processor unit operative to shift the plurality of gears between gear combinations based on the current received from the voltage generator.

3. The automatic transmission bicycle according to claim 2 wherein the processor unit has an adjustable associated voltage range for each gear combination from the plurality of gear combinations, the processor unit determines appropriate gear combinations from the plurality of gear combinations in response to receiving the current from the voltage generator within a predetermined voltage range.

4. The automatic transmission bicycle according to claim 1 wherein the gear shifter is configured to continuously receive the current generated by the voltage generator during rotation of the front or rear wheel.

5. The automatic transmission bicycle according to claim 1 wherein the electric motor is coupled to the bicycle frame between the chain ring and the wheel.

6. The automatic transmission bicycle according to claim 1 further comprising a battery coupled to the bicycle frame adjacent to the chain ring, the battery in electrical communication with the electric motor.

7. The automatic transmission bicycle according to claim 1 wherein the plurality of gears is a planetary gear system.

8. The automatic transmission bicycle according to claim 1 wherein the motor is an electric motor.

\* \* \* \* \*